Patented Nov. 27, 1951

2,576,897

UNITED STATES PATENT OFFICE 2,576,897

COMPOSITIONS OF MATTER CONTAINING SEMIESTERS OF DICARBOXYLIC ACIDS

Otto Albrecht, Neuewelt, near Basel, Switzerland, assignor to Ciba Limited, Basel, Switzerland, a Swiss firm No Drawing. Application April 26, 1948, Serial No. 23,385. In Switzerland February 27, 1946

12 Claims. (Cl. 252—8.75)

This invention is an improvement in or a modification of the invention forming the subject of U. S. patent application Serial No. 655,364, filed March 18, 1946, now abandoned, and is a continuation-in-part of U. S. application Serial No. 729,892, filed February 20, 1947, now abandoned.

The present invention relates to a water-soluble composition of matter producing a softening effect on regenerated cellulose when applied in hard water which comprises (a) a water-soluble salt of a semi-ester obtainable by reacting 1 molecular proportion of an aliphatic compound having at least 12 carbon atoms and containing at least one alcoholic hydroxyl group, at least one hetero-atom interrupting the carbon chain and at least one double bond, but free from basic nitrogen atoms, with 1 molecular proportion of a dicarboxylic acid which is free from double bonds except such as may be present in an aromatic ring or with 1 molecular proportion of a functional derivative of such acid, and (b) a lime-resistant dispersing agent. As aliphatic compounds having at least 12 carbon atoms and containing at least one alcoholic hydroxyl group, at least one hetero-atom interrupting the carbon chain and at least one double bond, but free from basic nitrogen atoms, there may be used, for example: N-hydroxyalkylamides and hydroxyalkyl esters of unsaturated fatty acids of high molecular weight, such as N-(β-hydroxyethyl)-oleic acid amide, N-(β-hydroxyethyl)-ricinoleic acid amide, N-(2-hydroxypropyl)-oleic acid amide or oleic acid β-hydroxyethyl ester; and also hydroxyalkyl ethers of unsaturated fatty alcohols, such as oleic alcohol β-hydroxy-ethyl ether.

Among the dicarboxylic acids to be used as starting materials and free from double bonds except such as may be present in an aromatic ring there may be mentioned, for example, oxalic acid, malonic acid, succinic acid, adipic acid, phthalic acid, terephthalic acid, naphthalic acid and also tetrahydrophthalic acid. As functional derivatives of such acids there are especially suitable their anhydrides. All these aromatic dicarboxylic acids and saturated aliphatic dicarboxylic acids are free from double bonds between aliphatically bound carbon atoms.

The reaction of the hydroxy-compound with the dicarboxylic acid may be carried out by heating the mixture of the starting materials, advantageously with the addition of a small quantity of a strong acid, until 1 molecular proportion of water is split off. It is of advantage, however, to heat the hydroxy-compound with the anhydride of the dicarboxylic acid, for example, at 90–120° C., until a test portion of the reaction mixture dissolves in dilute sodium carbonate solution.

The semi-esters of the compositions of matter according to the present invention are soluble in water in the form of their alkali salts, further as salts of water-soluble amines, and can be used as textile assistants. The alkali salts of the semi-esters serve as foaming or cleaning agents by virtue of their capillary activity. Special mention must be made of the soft feel which is imparted to cellulose fibers, especially in hard water, by the salts of the semi-esters of the invention when they contain an aliphatic residue of at least 16 carbon atoms, preferably 18 carbon atoms. The alkali salts of the semi-esters are distinguished by an especially good solubility in neutral or weakly acid liquors used in the textile industry, especially in baths used to impart anti-creasing properties to textiles. Textiles which have been rendered anti-creasing with the addition of water-soluble salts of the semi-esters of this invention possess a soft and flowing feel. The composition of matter of the present invention, however, are even more effective, because they do not form precipitations in hard water.

The following substances are examples of lime-resistant dispersing agents which may be contained in the compositions of matter of the present invention: water-soluble salts of sulfonated fatty alcohols or of sulfonated N-hydroxy-alkyl-amides of higher fatty acids or of aliphatic amino sulfonic acids or hydroxy sulfonic acids which are acylated at the amino or hydroxy group respectively by higher fatty acids; water-soluble salts of monoesters of higher fatty alcohols and 4-sulfo-phthalic acid; water-soluble salts of sulfonated μ-alkyl-benzimidazoles wherein the μ-alkyl radical contains at least 11 carbon atoms such as the alkali metal salt of N-benzyl-μ-heptadecyl-benzimidazole disulfonic acid. These substances are especially effective lime-resistant dispersing agents and are characterized by the fact that an aliphatic radical containing at least 12 carbon atoms is bound to a sulfonic acid group by a bridge containing at least one hetero-atom. In the above examples the hetero atoms are nitrogen or oxygen atoms.

The compositions of matter of the present invention may contain, for instance, about 10–50 per cent of a lime-resistant dispersing agent. Mixtures containing about 20–40 per cent of these dispersing agents are especially valuable.

Among the semi-esters used in the present invention there are particularly easily obtained water-soluble salts, for instance alkali metal salt, ammonium salts and amine salts, of semi-esters of the formula

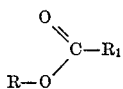

wherein R—O— is a monovalent radical of a hydroxy compound of the formula R—OH selected from the group consisting of N-hydroxy-alkyl amides and hydroxy-alkyl esters of unsaturated fatty acids having at least 12 carbon atoms and wherein

is a monovalent acyl radical of a dicarboxylic acid selected from the group consisting of saturated aliphatic dicarboxylic acids and dicarboxylic acids of the benzene series. Examples of such products are water-soluble salts of semi-esters of the formulas

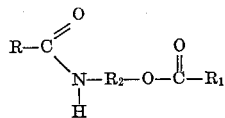

or

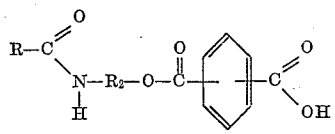

or

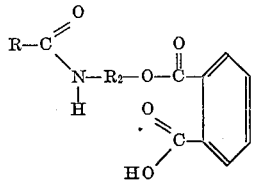

or

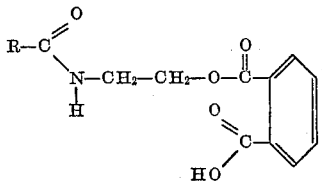

wherein

represents the acyl radical of an unsaturated fatty acid having at least 12 carbon atoms, $R_2$ represents alkylene and

represents a monovalent acyl radical of a dicarboxylic acid, for example of the formula

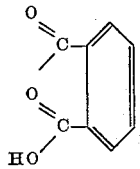

The following examples illustrate the invention, the parts being by weight:

*Example 1*

464 parts of N-(β-hydroxyethyl)-oleic acid amide and 221 parts of phthalic anhydride are stirred together at 95–100° C. until a test portion of the mixture neutralized with sodium hydroxide solution dissolves clearly in water. This is the case after about 3 hours. After cooling, the viscous phthalic acid ester of the formula

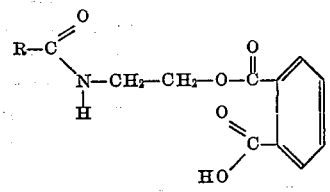

wherein

is the acyl radical of commercial oleic acid, is mixed with water, and converted into its sodium salt by neutralization with sodium hydroxide or sodium carbonate. After being dried the sodium salt of the new semi-ester is a soft mass which, when taken up in water, forms a clear foaming solution. It can be used as a textile assistant, for example, as a very effective softening agent for cellulose fibers. For this purpose there is suitable, for example, a mixture of 70 parts of the above sodium salt with 30 parts of the disodium salt of N-benzyl-μ-heptadecyl-benzimidazole disulfonic acid.

Instead of N-(β-hydroxyethyl)-oleic acid amide also N-(2-hydroxypropyl)-oleic acid amide or N-(β-hydroxyethyl)-ricinoleic acid amide may be reacted with phthalic anhydride. Moreover, N-(β-hydroxyethyl)-oleic acid amide may also be esterified with terephthalic acid, for example, by heating equimolecular quantities of the reaction participants to 150–180° C. until a test portion dissolves in dilute sodium carbonate solution. Heating is advantageously carried out in a current of nitrogen.

Instead of the disodium salt of the above benzimidazole disulfonic acid the sodium salt of the acid sulfuric acid ester of dodecyl alcohol or of the monocetyl ester of 4-sulfophthalic acid or of β-[N-oleoyl-N-methyl-amino]-ethane sulfonic acid or of the oleic acid ester of β-hydroxy-ethane-sulfonic acid may be used.

*Example 2*

8 parts of oleic acid β-hydroxyethyl ester and 3.6 parts of phthalic anhydride are stirred for 3 hours at 95–100° C. The resulting phthalic acid ester of the formula

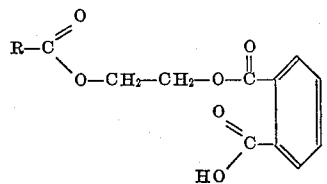

wherein

is the acyl radical of commercial oleic acid, is dissolved in alcohol and converted by neutralization with sodium hydroxide solution into its sodium salt. After being dried the sodium salt of the new semi-ester, which can be freed from small quantities of insoluble constituents by extraction with ether, is a soft mass which, when taken up in water, forms a foaming solution. It finds application as a textile assistant, especially in admixture with the lime-resistant dispersing agents as mentioned in Example 1. Mixtures of this type may contain 20–40 per cent. of the lime-resistant dispersing agent.

*Example 3*

5 parts of succinic anhydride and 16.3 parts of N-(β-hydroxyethyl)-oleic acid amide are stirred at 130–140° C. until a test portion dissolves in dilute sodium hydroxide solution. The ester-acid of the formula

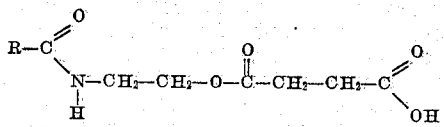

wherein

is the acyl radical of commercial oleic acid, when converted into its sodium salt in the usual manner, finds application as a textile assistant, for example, as a softening agent, especially in admixture with the lime-resistant dispersing agents as mentioned in Example 1. Mixtures of this type may contain 20–40 per cent. of the lime-resistant dispersing agent.

What I claim is:

1. A water-soluble composition of matter producing a softening effect on regenerated cellulose when applied in hard water consisting essentially of (a) 50–90 per cent. of a water-soluble salt of a semi-ester of the formula

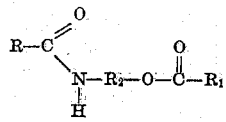

wherein

is an acyl radical of an unsaturated fatty acid having at least 12 carbon atoms, R₂ is an alkylene radical which contains at least two carbon atoms, and wherein

is a monovalent acyl radical of a dicarboxylic acid which is free from double bonds between aliphatically bound carbon atoms and (b) of 10–50 per cent. of a lime-resistant dispersing agent, in which an aliphatic radical containing at least 12 carbon atoms is bound to a sulfonic acid group by a bridge containing at least one hetero atom, said agent being selected from the group consisting of sulfonated μ-alkyl-benzimidazoles wherein the μ-alkyl radical contains at least 12 carbon atoms, acid sulfuric acid esters of fatty alcohols containing at least 12 carbon atoms, aliphatic amino sulfonic acids wherein the amino group is acylated by a fatty acid containing at least 12 carbon atoms, aliphatic hydroxy sulfonic acids wherein the hydroxy group is acylated by a fatty acid containing at least 12 carbon atoms, and monoesters of fatty alcohols containing at least 12 carbon atoms with aromatic dicarboxylic monosulfonic acids of the benzene series.

2. A water-soluble composition of matter producing a softening effect on regenerated cellulose when applied in hard water consisting essentially of (a) 50–90 per cent. of a water-soluble salt of a semi-ester of the formula

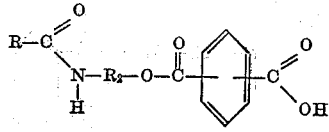

wherein

is an acyl radical of an unsaturated fatty acid having at least 12 carbon atoms and R₂ is an alkylene radical which contains at least two carbon atoms, and (b) of 10–50 per cent. of a lime-resistant dispersing agent, in which an aliphatic radical containing at least 12 carbon atoms is bound to a sulfonic acid group by a bridge containing at least one hetero atom, said agent being selected from the group consisting of sulfonated μ-alkyl-benzimidazoles wherein the μ-alkyl radical contains at least 12 carbon atoms, acid sulfuric acid esters of fatty alcohols containing at least 12 carbon atoms, aliphatic amino sulfonic acids wherein the amino group is acylated by a fatty acid containing at least 12 carbon atoms, aliphatic hydroxy sulfonic acids wherein the hydroxy group is acylated by a fatty acid containing at least 12 carbon atoms, and monoesters of fatty alcohols containing at least 12 carbon atoms with aromatic dicarboxylic monosulfonic acids of the benzene series.

3. A water-soluble composition of matter producing a softening effect on regenerated cellulose when applied in hard water consisting essentially of (a) 50–90 per cent. of a water-soluble salt of a semi-ester of the formula

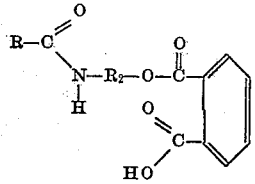

wherein

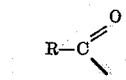

is an acyl radical of an unsaturated fatty acid having at least 12 carbon atoms and R₂ is an alkylene radical which contains at least two carbon atoms, and (b) of 10–50 per cent. of a lime-resistant dispersing agent, in which an aliphatic radical containing at least 12 carbon atoms is bound to a sulfonic acid group by a bridge containing at least one hetero atom, said agent being selected from the group consisting of sulfonated μ-alkyl benzimidazoles wherein the μ-alkyl radical contains at least 12 carbon atoms, acid sulfuric acid esters of fatty alcohols containing at least 12 carbon atoms, aliphatic amino sulfonic acids wherein the amino group is acylated by a fatty acid containing at least 12 carbon atoms, aliphatic hydroxy sulfonic acids wherein the hydroxy group is acylated by a fatty acid containing at least 12 carbon atoms, and monoesters of fatty alcohols containing at least 12 carbon atoms with aromatic dicarboxylic monosulfonic acids of the benzene series.

4. A water-soluble composition of matter producing a softening effect on regenerated cellulose when applied in hard water consisting essentially of (a) 50–90 per cent. of a water-soluble salt of a semi-ester of the formula

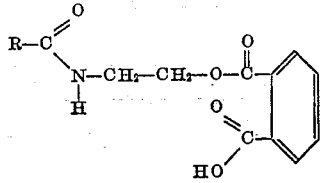

wherein

is an acyl radical of an unsaturated fatty acid having 18 carbon atoms, and (b) of 10–50 per cent. of a lime-resistant dispersing agent, in which an aliphatic radical containing at least 12 carbon atoms is bound to a sulfonic acid group by a bridge containing at least one hetero atom, said agent being selected from the group consisting of sulfonated µ-alkyl-benzimidazoles wherein the µ-alkyl radical contains at least 12 carbon atoms, acid sulfuric acid esters of fatty alcohols containing at least 12 carbon atoms, aliphatic amino sulfonic acids wherein the amino group is acylated by a fatty acid containing at least 12 carbon atoms, aliphatic hydroxy sulfonic acids wherein the hydroxy group is acylated by a fatty acid containing at least 12 carbon atoms, and monoesters of fatty alcohols containing at least 12 carbon atoms with aromatic dicarboxylic monosulfonic acids of the benzene series.

5. A water-soluble composition of matter producing a softening effect on regenerated cellulose when applied in hard water consisting essentially of (a) 50–90 per cent. of a water-soluble salt of a semi-ester of the formula

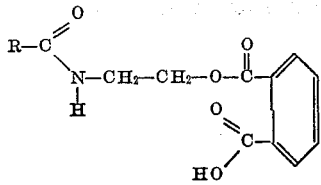

wherein

is the acyl radical of commercial oleic acid, and (b) of 10–50 per cent. of a lime-resistant dispersing agent, in which an aliphatic radical containing at least 12 carbon atoms is bound to a sulfonic acid group by a bridge containing at least one hetero atom, said agent being selected from the group consisting of sulfonated µ-alkyl-benzimidazoles wherein the µ-alkyl radical contains at least 12 carbon atoms, acid sulfuric acid esters of fatty alcohols containing at least 12 carbon atoms, aliphatic amino sulfonic acids wherein the amino group is acylated by a fatty acid containing at least 12 carbon atoms, aliphatic hydroxy sulfonic acids wherein the hydroxy group is acylated by a fatty acid containing at least 12 carbon atoms, and monoesters of fatty alcohols containing at least 12 carbon atoms with aromatic dicarboxylic monosulfonic acids of the benzene series.

6. A water-soluble composition of matter producing a softening effect on regenerated cellulose when applied in hard water consisting essentially of (a) 50–90 per cent. of a water-soluble salt of a semi-ester of the formula

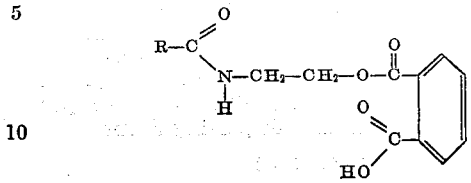

wherein

is the acyl radical of commercial oleic acid, and (b) of 10–50 per cent. of an alkali salt of a sulfonated µ-alkyl-benzimidazole wherein the µ-alkyl radical contains at least 11 carbon atoms.

7. A water-soluble composition of matter producing a softening effect on regenerated cellulose when applied in hard water consisting essentially of (a) 50–90 per cent. of a water-soluble salt of a semi-ester of the formula

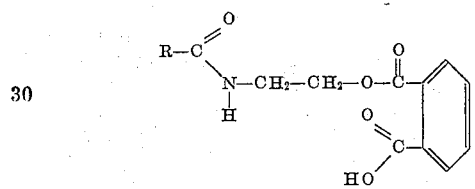

wherein

is the acyl radical of commercial oleic acid, and (b) of 10–50 per cent. of an alkali salt of N-benzyl-µ-heptadecyl benzimidazole disulfonic acid.

8. A water-soluble composition of matter producing a softening effect on regenerated cellulose when applied in hard water consisting essentially of (a) a water-soluble salt of a semi-ester of the formula

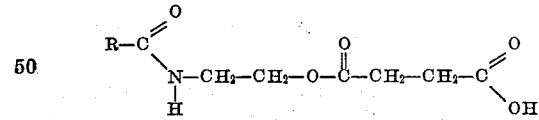

wherein

is the acyl radical of commercial oleic acid, and (b) of 10–50 per cent. of an alkali salt of a sulfonated µ-alkyl-benzimidazole wherein the µ-alkyl radical contains at least 11 carbon atoms.

9. A water-soluble composition of matter producing a softening effect on regenerated cellulose when applied in hard water consisting essentially of (a) a water-soluble salt of a semi-ester of the formula

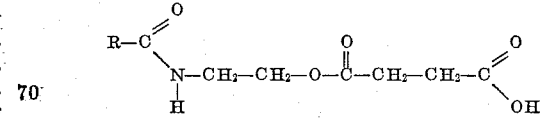

wherein

is the acyl radical of commercial oleic acid, and (b) of 10–50 per cent. of an alkali salt of N-benzyl-μ-heptadecyl-benzimidazole disulfonic acid.

10. A process for softening regenerated cellulose in hard water, which comprises treating regenerated cellulose with an aqueous solution of a water-soluble composition of matter consisting essentially of (a) 50–90 per cent. of a water-soluble salt of a semi-ester of the formula

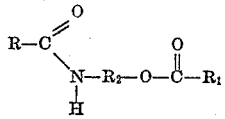

wherein

is an acyl radical of an unsaturated fatty acid having at least 12 carbon atoms, $R_2$ is an alkylene radical which contains at least two carbon atoms, and wherein

is a monovalent acyl radical of a dicarboxylic acid which is free from double bonds between aliphatically bound carbon atoms, and (b) of 10–50 per cent. of a lime-resistant dispersing agent in which an aliphatic radical containing at least 12 carbon atoms is bound to a sulfonic acid group by a bridge containing at least one hetero atom, said agent being selected from the group consisting of sulfonated μ-alkyl-benzimidazoles wherein the μ-alkyl radical contains at least 12 carbon atoms, acid sulfuric acid esters of fatty alcohols containing at least 12 carbon atoms, aliphatic amino sulfonic acids wherein the amino group is acylated by a fatty acid containing at least 12 carbon atoms, aliphatic hydroxy sulfonic acids wherein the hydroxy group is acylated by a fatty acid containing at least 12 carbon atoms, and monoesters of fatty alcohols containing at least 12 carbon atoms with aromatic dicarboxylic monosulfonic acids of the benzene series.

11. A process for softening regenerated cellulose in hard water, which comprises treating regenerated cellulose with an aqueous solution of a water-soluble composition of matter consisting of (a) 50–90 per cent. of a water-soluble salt of a semi-ester of the formula

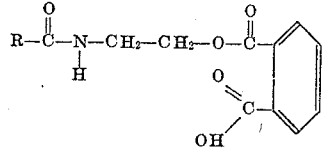

wherein

is the acyl radical of commercial oleic acid, and (b) of 10–50 per cent. of an alkali salt of N-benzyl-μ-heptadecyl-benzimidazole disulfonic acid.

12. A process for softening regenerated cellulose in hard water, which comprises treating regenerated cellulose with an aqueous solution of a water-soluble composition of matter consisting essentially of (a) 50–90 per cent. of a water-soluble salt of a semi-ester of the formula

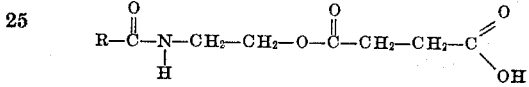

wherein

is the acyl radical of commercial oleic acid, and (b) of 10–50 per cent. of an alkali salt of N-benzyl-μ-heptadecyl-benzimidazole disulfonic acid.

OTTO ALBRECHT.

REFERENCES CITED

The following references are of record in the file of this patent:

UNITED STATES PATENTS

| Number | Name | Date |
| --- | --- | --- |
| 2,023,976 | Roberts | Dec. 10, 1935 |
| 2,043,164 | Granacher | June 2, 1936 |
| 2,106,240 | De Groote et al. | Jan. 25, 1938 |
| 2,232,485 | Shipp | Feb. 18, 1941 |
| 2,246,264 | Pinkernelle | June 17, 1941 |
| 2,337,220 | Albrecht | Dec. 21, 1943 |
| 2,343,431 | Wells et al. | Mar. 7, 1944 |
| 2,417,513 | Nelles et al. | Mar. 18, 1947 |